Dec. 29, 1964    J. RIEDHAMMER ETAL    3,163,094
PISTON ASSEMBLY AND PROCESS FOR ASSEMBLING THE SAME
Filed Dec. 31, 1963
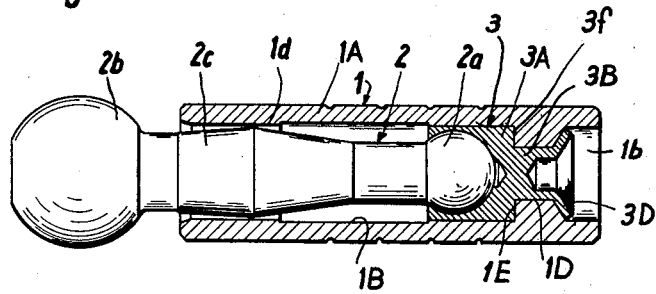
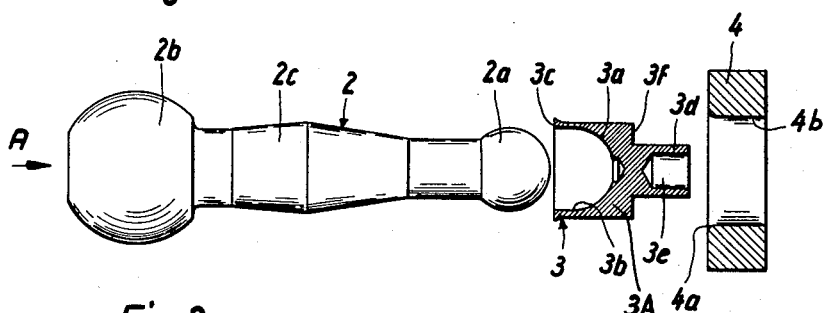
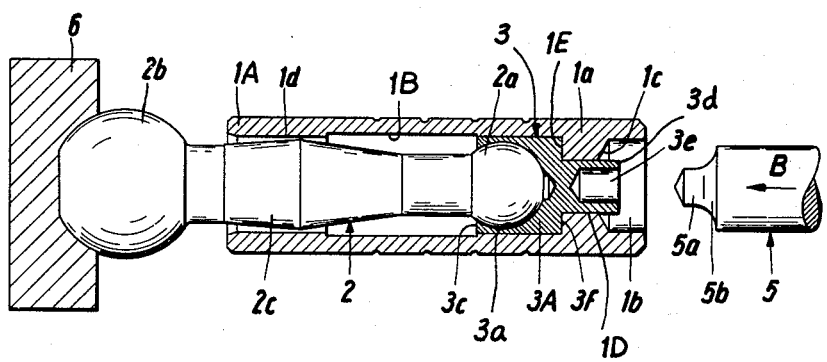
Inventors:
HERBERT TRÄGER
JOSEF RIEDHAMMER
BY Michael J. Striker
their Attorney

United States Patent Office 3,163,094
Patented Dec. 29, 1964

3,163,094
PISTON ASSEMBLY AND PROCESS FOR ASSEMBLING THE SAME
Josef Riedhammer and Herbert Träger, Horb (Neckar), Germany, assignors to Stahlwerke Brueninghaus G.m.b.H., Westhofen, Germany
Filed Dec. 31, 1963, Ser. No. 334,850
17 Claims. (Cl. 92—208)

The present invention relates to a piston assembly of the type which may be used for axial piston machines such as wobble plate pumps and the like, and more particularly to novel connections between the connecting rods and pistons of such assemblies. The invention also relates to an improved process for assembling a connecting rod with a trunk type piston in such a way that the connecting rod may swivel with respect to the piston.

It is an important object of our invention to provide a connection between the connecting rod and the piston of an axial piston motor which is of very simple construction, which comprises an exceptionally small number of parts, and which insures that there is absolutely no axial play between the connecting rod and the piston when the assembly is in actual use.

Another object of our invention is to provide a piston assembly of the just outlined characteristics wherein the connection between the connecting rod and the piston consists of a single element and wherein such single element may be mass-produced at low cost.

A further object of the invention is to provide a piston assembly wherein the connecting rod may be coupled to the piston with the help of very simple instrumentalities and in a time-saving operation.

An additional object of the invention is to provide a piston assembly which is constructed and assembled in such a way that the connection between the connecting rod and the piston remains unchanged for unlimited periods of time so that vibrations or other types of shocks cannot affect the connection and that the connection provides a permanent joint between one end portion of the connecting rod and the bottom wall of the piston.

A concomitant object of the invention is to provide a process for coupling a spherical end portion of a connecting rod with a coupling element which serves to connect the rod with the bottom wall of a trunk type piston.

Still another object of the invention is to provide a process for anchoring the just described coupling element in the bottom wall of a trunk type piston in such a way that the coupling element is held against any axial movements with respect to the piston and that the coupling element simultaneously connects the rod with the piston while permitting requisite articulation of the connecting rod.

With the above objects in view, one feature of our invention resides in the provision of a process for coupling one end portion of a connecting rod with a trunk type piston whose skirt is provided with a transversely extending wall having an axially extending aperture. The process comprises the steps of coupling the end portion of the connecting rod with a deformable one-piece coupling element which includes a projection arranged to fit into and to extend through and beyond the aperture of the wall, inserting the coupling element into the piston so that the end portion of the connecting rod is received in the skirt and is adjacent to one side of the wall and that the projection extends through and beyond the aperture, and deforming the projection against the other side of the wall so that the coupling element is anchored in the wall and simultaneously couples the connecting rod with the piston.

In accordance with another feature of our invention, the process also comprises the steps of coupling a spherical end portion of the connecting rod with a piston whose skirt is provided with a cylindrical chamber and wherein the wall is located intermediate the open ends of the skirt. The process then comprises the additional steps of forming the coupling element with an end section whose outer diameter exceeds the diameter of the chamber and which is provided with a socket arranged to receive the major part of the spherical end portion, inserting the spherical end portion into the socket and thereupon passing the end section through an annular die whose internal diameter equals the diameter of the chamber whereby the end section is deformed and is coupled with the connecting rod in such a way that the latter may swivel with respect to the coupling element, and thereupon anchoring the coupling element in the wall of the piston.

In accordance with a further feature of our invention, the projection of the coupling element is preferably of annular shape and is deformed by means of a spreading tool which fits into and which is moved axially with respect to the piston so as to expand the projection against the adjacent side of the wall whereby the projection comprises a first section which is received in the aperture and a deformed second section whose transverse dimensions (as seen in the radial direction of the piston) are greater than the radial dimensions of the aperture. The radial dimensions of the end section which surrounds the spherical end portion of the connecting rod also exceed the radial dimensions of the aperture so that the coupling element is automatically anchored in the wall once its projection is deformed.

As a rule, the die remains stationary and the end section of the coupling element is caused to pass through such stationary die whereby the connecting rod actually performs the function of a ram and is moved with the coupling element to deform the end section by simultaneous retention of its spherical end portion in the socket of the end section.

The completed piston assembly comprises a trunk type piston having an open end and a transversely extending bottom wall which is formed with an axially extending aperture and which is provided in and is spaced from the open end of the skirt, a connecting rod extending through the open end of and into the skirt and having a spherical end portion adjacent to one side of the bottom wall, and a deformable one-piece coupling element including a first section received in the skirt at one side of the bottom wall and articulately coupled to the end portion of the connecting rod so that the latter may swivel with respect to the coupling element, a second section which fits snugly into the aperture of the bottom wall, and a third section which is located at and is deformed radially outwardly against the other side of the bottom wall. The transverse dimensions of the first and third sections of the coupling element exceed the transverse dimensions of the aperture in the bottom wall as seen in the radial direction of the piston so that the coupling element is anchored in the bottom wall against any axial movements with respect to the piston and that the thus anchored coupling element simultaneously couples the connecting rod to the piston.

The novel features which are considered as characteristic of the invention are set forth in particular in the appended claims. The improved piston assembly itself, however, both as to its construction and the process of assembling the same, together with additional features and advantages thereof, will be best understood from the following detailed description of a specific embodiment with reference to the accompanying drawings, in which:

FIG. 1 is a side elevational view of a connecting rod which is about to be coupled to the coupling element, further showing a stationary annular die which is illustrated in axial section and which is aligned with the undeformed coupling element;

FIG. 2 illustrates the next step of our process wherein the connecting rod is already coupled with the end section of the coupling element and wherein the coupling element is about to be anchored in the wall of a trunk type piston by means of a spreading tool which may be fitted into a blind bore provided in the projection of the coupling element, the piston as well as the coupling element and a stationary stop for the connecting rod being shown in axial section; and FIG. 3 is an axial section through the piston and coupling element of a completed piston assembly, the connecting rod being shown in side elevation.

Referring to the drawings, and first to FIG. 1, there is shown a connecting rod 2 which comprises a first spherical end portion 2a, a second spherical end portion 2b of larger diameter which may be coupled to a driving or reciprocating device (not shown), and a biconical intermediate portion or stem 2c which serves to limit the extent of swivelling movement of the connecting rod when the latter is properly coupled to a trunk type piston 1 which is shown in FIGS. 2 and 3. FIG. 1 further shows a specially configured one-piece coupling element 3 which is illustrated in undeformed condition and which is about to be coupled to the spherical end portion 2a. This coupling element consists of deformable material and includes an end section 3A having a spherical socket 3a whose open end is bounded by a cylindrical surface 3b, and an annular projection 3d of cylindrical outline which is formed with a blind bore 3e. The left-hand end portion 3c of the end section 3A has a thickness which exceeds the thickness of the portion immediately adjacent thereto, i.e., the thickness of the end portion 3c diminishes gradually in a direction toward the projection 3d and the major part of the end section 3A is of cylindrical outline save for the end portion 3c which diverges conically outwardly in a direction away from the projection 3d. There is an annular shoulder 3f which is located in a plane perpendicular to the axis of the coupling element 3 and which is disposed between the end section 3A and projection 3d.

The piston 1 which is shown in FIGS. 2 and 3 comprises a skirt 1A defining an internal chamber 1B and having a transversely extending bottom wall 1a which is adjacent to but slightly spaced from its right-hand open end so that the wall 1a and the skirt 1A define between themselves a comparatively shallow recess 1b which is located at the pressure side of the piston and which extends from the right-hand side of the wall 1a and all the way to the right-hand open end of the skirt. This wall 1a is provided with a centrally located axially extending cylindrical aperture 1D whose diameter equals the diameter of the projection 3d so that the latter is readily insertable into the wall 1a. It will be noted that the axial length of the projection 3d exceeds the thickness of the wall 1a so that the projection may extend through and beyond the aperture 1D. The right-hand side of the wall 1a is bounded by a conical surface 1c of annular shape which diverges outwardly in a direction toward the right-hand open end of the skirt 1A, and the left-hand side of this wall is bounded by an annular surface 1E which is located in a plane perpendicular to the axis of the piston 1 and which may serve as a stop for the shoulder 3f on the end section 3A. Adjacent to its left-hand open end, the skirt 1A is provided with a cylindrical internal surface 1d whose diameter exceeds somewhat the maximum diameter of the biconcave intermediate portion 2c of the connecting rod 2 so that this surface determines the extent to which the connecting rod may swivel in the chamber 1B.

The process of coupling the connecting rod 2 with the coupling element 3 is carried out as follows:

In the first step, the spherical end portion 2a of the connecting rod 2 is inserted into the socket 3a by passing along the cylindrical surface 3b whose diameter equals to diameter of the end portion 2a. The connecting rod 2 is then caused to move in a direction to the right (see the arrow A in FIG. 1) and causes the coupling element 3 to pass through the orifice 4b of a stationary annular die 4 whose internal diameter equals the diameter of the chamber 1B in the skirt 1A. The mouth 4a of the die 4 flares outwardly to facilitate insertion of the end section 3A. The end section 3A is now deformed in that its left-hand end portion 3c moves radially inwardly and follows the outlines of the spherical end portion 2a. The major part of the end portion 2a is received in the socket 3a so that the element 3 is coupled with the connecting rod 2 but permits the latter to swivel with respect to the deformed end section 3A. Of course, it is equally possible to hold the connecting rod 2 and to move the die 4 in a direction to the left, as viewed in FIG. 1, in order to reduce the external diameter of the end section 3A and to enable this end section to fit snugly into the chamber 1B in a manner as shown in FIG. 2. The left-hand end portion 2b of the ram 2 is then placed against a stationary stop 6 and the piston 1 is slipped onto the coupling element 3 in such a way that the left-hand annular surface 1E of its bottom wall 1a abuts against the shoulder 3f and that the projection 1c extends through and beyond the aperture 1D, i.e., the annular end of the projection 1c extends into the recess 1b and is surrounded by the conical surface 1c. In the next step, the operator uses a specially configured spreading tool 5 whose tip 5a fits into the bore 3e and which includes a conical intermediate portion 3b having a diameter exceeding the diameter of the tip 5a so that the left-hand end of the projection 3d is expanded against the conical surface 1c to thereby anchor the coupling element 3 in the bottom wall 1a and to prevent any axial displacement of the coupling element. The completed piston assembly is shown in FIG. 3, and it will be noted that the deformed coupling element 3 now comprises a first section of cylindrical outline (the end section 3A) which is snugly received in the cylindrical chamber 1B at the left-hand side of the wall 1c so that its shoulder 3f abuts against the annular surface 1E, a cylindrical second section 3B which is snugly received in the aperture 1D, and a third section 3D which flares radially outwardly and which is received in the recess 1b and follows the outline of the conical surface 1c. In assembling the coupling element 3 with the piston 1, the piston serves as a matrix and the tool 5 serves as a ram and is moved in the direction indicated by an arrow B (see FIG. 2) so as to deform the projection 3d and to transform this projection into a body including the aforementioned sections 3B and 3D. The piston assembly of FIG. 3 is now ready to be coupled to a driving element, such as a wobble plate or the like, not shown, which may be connected with the left-hand end portion 2b of the connecting rod 2. It will be noted that the transverse dimensions (diameters) of the sections 3A and 3D are greater than the transverse dimensions (diameter) of the aperture 1D so that the one-piece coupling element 3 is safely anchored in the bottom wall 1a and may cause the piston 1 to move axially back and forth in response to reciprocation of the connecting rod 2. When the connecting rod 2 and the piston 1 are assembled in the manner as shown in FIG. 3, the skirt 1A prevents withdrawal of the end portion 2a from the socket 3a because the inwardly deformed end portion 3c abuts against the internal surface of the skirt and cannot expand in response to a pull which would tend to withdraw the end portion 2a.

The coupling element 3 may be mass-produced by drop forging or in any other suitable way.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A piston assembly comprising a trunk type piston including a skirt having an open end and a transversely extending wall provided in and spaced from the open end of said skirt, said wall having an axially extending aperture; a connecting rod extending through the open end of and into said skirt and having an end portion adjacent to said wall; and deformable one-piece coupling means including a first section received in said skirt at one side of said wall and coupled to the end portion of said connecting rod, a second section received in said aperture, and a third section located at the other side of said wall, the transverse dimensions of said first and third sections as seen in the radial direction of said piston being greater than the transverse dimensions of said aperture whereby said coupling means is anchored in said wall and simultaneously couples said connecting rod to said piston.

2. A piston assembly comprising a trunk type piston including a skirt having an open end and a second end, and a transversely extending bottom wall provided in and adjacent to the second end of said skirt, said bottom wall having a centrally located axially extending aperture; a connecting rod extending through the open end of said skirt and having an end portion adjacent to said bottom wall; and deformable one-piece coupling means including a first section received in said skirt at one side of said bottom wall and coupled to the end portion of said connecting rod, a cylindrical second section received in said aperture, and a third section adjacent to the other side of said bottom wall, the diameters of said first and third sections being greater than the diameter of said aperture so that said coupling means is anchored in said bottom wall and simultaneously couples said connecting rod to said piston.

3. A piston assembly comprising a trunk type piston including a skirt having an open end and a transversely extending wall provided in and spaced from the open end of said skirt, said wall having a first side nearer to said open end, a second side more distant from said open end, an axial aperture extending between said first and second sides, and an annular surface surrounding said aperture at said second side and diverging conically outwardly in a direction away from said open end; a connecting rod extending through the open end of and into said skirt and having an end portion adjacent to said wall; and deformable one-piece coupling means including a first section received in said skirt at one side of said wall and coupled to the end portion of said connecting rod, a second section received in said aperture, and a third section located at the other side of said wall, the transverse dimensions of said first and third sections as seen in the radial direction of said piston being greater than the transverse dimensions of said aperture whereby said coupling means is anchored in said wall and simultaneously couples said connecting rod to said piston, said third section extending along said conically outwardly diverging surface at the second side of said wall.

4. A piston assembly comprising a trunk type piston including a skirt having an open end and a transversely extending wall provided in and spaced from the open end of said skirt, said wall having an axially extending aperture; a connecting rod extending through the open end of and into said skirt and having an end portion adjacent to said wall; and deformable one-piece coupling means including a first section received in said skirt at one side of said wall and coupled to the end portion of said connecting rod, a second section received in said aperture, and a third section located at the other side of said wall, the transverse dimensions of said first and third sections as seen in the radial direction of said piston being greater than the transverse dimensions of said aperture whereby said coupling means is anchored in said wall and simultaneously couples said connecting rod to said piston, said coupling means having a bore provided in said third section thereof so that said third section is of annular shape.

5. A piston assembly comprising a trunk type piston including a skirt having a first and a second open end, and a transversely extending wall provided in said skirt and adjacent to said second open end so as to form with said skirt a recess which terminates at said second open end, said wall having an axially extending aperture; a connecting rod extending through said first open end and having an end portion adjacent to said wall; and deformable one-piece coupling means including a first section received in said skirt at one side of said wall and coupled to the end portion of said connecting rod, a second section received in said aperture, and a third section received in said recess, the transverse dimensions of said first and third sections being greater than the transverse dimensions of said aperture as seen in the radial direction of said piston whereby said coupling means is anchored in said wall and simultaneously couples said connecting rod to said piston.

6. A piston assembly comprising a trunk type piston including a skirt having a first and a second open end, and a transversely extending wall provided in said skirt and adjacent to said second open end so as to form with said skirt a recess which terminates at said second open end, said wall having an axially extending aperture and an annular surface provided in said recess and diverging conically outwardly toward said second open end; a connecting rod extending through said first open end and having an end portion adjacent to said wall; and deformable one-piece coupling means including a first section received in said skirt at one side of said wall and coupled to the end portion of said connecting rod, a second section received in said aperture, and a third section received in said recess, the transverse dimensions of said first and third sections being greater than the transverse dimensions of said aperture as seen in the radial direction of said piston whereby said coupling means is anchored in said wall and simultaneously couples said connecting rod to said piston, said third section extending along the annular surface of said wall.

7. A piston assembly comprising a trunk type piston including a skirt having an open end and a transversely extending wall provided in and spaced from the open end of said skirt, said wall having an axially extending aperture; a connecting rod extending through the open end of and into said skirt and having a spherical end portion adjacent to said wall; and deformable one-piece coupling means including a first section received in said skirt at one side of said wall and having a spherical socket receiving the spherical end portion of said connecting rod so that the connecting rod is coupled to and may swivel with respect to said coupling means, a second section received in said aperture, and a third section located at the other side of said wall, the transverse dimensions of said first and third sections as seen in the radial direction of said piston being greater than the transverse dimensions of said aperture whereby said coupling means is anchored in said wall and simultaneously couples said connecting rod to said piston.

8. A piston assembly comprising a trunk type piston including a skirt having a cylindrical chamber with an open end and a transversely extending wall provided in and spaced from the open end of said skirt, said wall having an axially extending aperture communicating with said chamber and an annular surface located in said chamber and surrounding said aperture; a connecting rod extending through the open end of and into said chamber and having an end portion adjacent to said wall; and deformable one-piece coupling means including a first section of cylindrical outline snugly received in said chamber adjacent to said annular surface and coupled to the end portion of said connecting rod, a second section received in said aperture, and a third section located at the other side of said wall, the transverse dimensions of said first and third sections as seen in the radial direction of said piston being greater than the transverse dimensions of said aperture whereby said coupling means is anchored in said wall and simultaneously couples said connecting rod to said piston, said first section having an annular shoulder which abuts against the annular surface of said wall.

9. A piston assembly comprising a trunk type piston including a skirt having an open end and a transversely extending wall provided in and spaced from the open end of said skirt, said wall having an axially extending aperture; a connecting rod extending through the open end of and into said skirt and having an end portion adjacent to said wall; and deformable one-piece coupling means including a first section received in said skirt at one side of said wall and deformed about the end portion of said connecting rod so as to couple the connecting rod to said coupling means, a second section received in said aperture, and a third section located at and deformed against the other side of said wall, the transverse dimensions of said first and third sections as seen in the radial direction of said piston being greater than the transverse dimensions of said aperture whereby said coupling means is anchored in said wall and simultaneously couples said connecting rod to said piston.

10. A piston assembly as set forth in claim 9, wherein the end portion of said connecting rod is of spherical shape and wherein the first section of said coupling means has a socket of spherical shape and surrounds the major portion of the peripheral surface of said end portion so that the end portion is anchored in but is free to swivel with respect to said coupling means, said skirt defining a cylindrical chamber at said one side of said wall and said first section being snugly received in said chamber.

11. A piston assembly as set forth in claim 10, wherein said first section includes an annular end portion which surrounds the end portion of said connecting rod and whose thickness diminishes in a direction toward said wall.

12. A process for coupling one end portion of a connecting rod with a trunk type piston whose skirt is provided with a transversely extending wall having an axially extending bore, comprising the steps of coupling the end portion of the connecting rod with a deformable one-piece coupling element which includes a projection arranged to fit into and to extend beyond the aperture of the wall; inserting the coupling element into the piston so that the end portion of the connecting rod is received in the skirt at one side of the wall and that the projection of the coupling element extends through and beyond the aperture; and deforming the projection against the other side of the wall so that the coupling element is anchored in the wall and simultaneously couples the connecting rod to the piston.

13. A process for coupling a spherical end portion of a connecting rod with a trunk type piston whose skirt is provided with a cylindrical chamber and includes a transversely extending wall having an axially extending aperture, comprising the steps of forming a one-piece coupling element of deformable material with a projection arranged to fit into and to extend beyond the aperture in the wall and with an end section which has an outer diameter exceeding the diameter of the chamber and a socket dimensioned to receive the major part of the spherical end portion; introducing the end portion into the socket and deforming the end section so that the end portion of the connecting rod is coupled to and may swivel with respect to the coupling element and that the diameter of the end section is reduced to the diameter of the chamber; inserting the thus deformed end section into the chamber so that the end portion of the connecting rod is received in the skirt at one side of the wall and that the projection extends through and beyond the aperture; and deforming the projection against the other side of the wall so that the coupling element in anchored in the wall and simultaneously couples the connecting rod to the piston.

14. A process as set forth in claim 13, wherein the end section of the coupling element is deformed by passing through an annular die whose internal diameter equals the diameter of the chamber.

15. A process for coupling one end portion of a connecting rod with a trunk type piston whose skirt is provided intermediate its open ends with a transversely extending wall having an axially extending bore, comprising the steps of coupling the end portion of the connecting rod with a deformable one-piece coupling element which includes an annular projection arranged to fit into and to extend beyond the aperture of the wall; inserting the coupling element through one open end of the skirt so that the end portion of the connecting rod is received in the skirt at one side of the wall and that the projection of the coupling element extends through and beyond the aperture; and deforming the annular projection by a spreading tool which fits into and which expands the projection against the other side of the wall so that the coupling element in anchored in the wall and simultaneously couples the connecting rod to the piston.

16. A process as set forth in claim 15, wherein the connecting rod and the piston are held against axial movement during expansion of the annular projection against the other side of the wall and wherein the tool and the piston respectively constitute a ram and a matrix to deform the projection against the wall in response to axial displacement of the tool through the other open end and toward the one open end of the skirt.

17. A piston assembly comprising a tubular piston having a transversely extending wall provided with an axially extending aperture; a connecting rod having an end portion received in the piston and adjacent to one side of said wall; and a coupling element including a first section adjacent to said one side of the wall and coupled to the end portion of said connecting rod, a second section received in said aperture, and a third section consisting of deformable material and located at the other side of the wall, said third section being deformed against said other side of the wall so that the connecting rod cannot be withdrawn from said piston.

References Cited by the Examiner
UNITED STATES PATENTS 2,296,469 9/42 Kastler _____ 92—187
2,438,839 3/48 Beeh _____ 92—187

RICHARD B. WILKINSON, *Primary Examiner.*

KARL J. ALBRECHT, *Examiner.*